United States Patent [19]
Nakamura et al.

[11] Patent Number: 6,138,001
[45] Date of Patent: Oct. 24, 2000

[54] SCHEME FOR INTERMITTENT RECEPTION OF PAGING SIGNALS IN MOBILE COMMUNICATION SYSTEM

[75] Inventors: Takehiro Nakamura, Yokosukashi; Kouji Ohno, Yokohamashi; Etsuhiro Nakano, Yokosukashi, all of Japan

[73] Assignee: NTT Mobile Communications Network, Inc., Tokyo, Japan

[21] Appl. No.: 08/814,363

[22] Filed: Mar. 11, 1997

[30] Foreign Application Priority Data

Mar. 12, 1996 [JP] Japan .................................. 8-055095

[51] Int. Cl.[7] ...................................................... H04B 1/16
[52] U.S. Cl. .......................... 455/343; 455/38.3; 455/574; 455/63; 340/825.44
[58] Field of Search .................................. 455/458, 38.3, 455/343, 422, 38.1, 38.2, 561, 572, 432, 436, 31.3, 574, 504, 63, 67.1, 67.6; 340/825.44, 825.31, 825.34

[56] References Cited

U.S. PATENT DOCUMENTS

| | | | |
|---|---|---|---|
| 4,449,248 | 5/1984 | Leslie et al. .............................. | 455/343 |
| 5,241,542 | 8/1993 | Natarajan et al. ...................... | 455/38.3 |
| 5,491,718 | 2/1996 | Gould et al. . | |
| 5,692,015 | 11/1997 | Higashi et al. .......................... | 375/340 |
| 5,722,065 | 2/1998 | Ito et al. ................................. | 455/38.3 |
| 5,745,860 | 4/1998 | Kallin ...................................... | 455/574 |
| 5,835,860 | 11/1998 | Diachina ................................. | 455/458 |
| 5,842,114 | 11/1998 | Ozluturk ................................. | 455/522 |

FOREIGN PATENT DOCUMENTS

| | | |
|---|---|---|
| 0 629 095 | 12/1994 | European Pat. Off. . |
| 0 687 078 | 12/1995 | European Pat. Off. . |
| 60-212040 | 10/1985 | Japan . |
| 64-7742 | 1/1989 | Japan . |
| WO 92/10042 | 6/1992 | WIPO . |
| WO 95/12931 | 5/1995 | WIPO . |
| WO 95/12932 | 5/1995 | WIPO . |
| WO 97/20446 | 6/1997 | WIPO . |

*Primary Examiner*—Doris H. To
*Attorney, Agent, or Firm*—Oblon, Spivak, McClelland, Maier & Neustadt, P.C.

[57] ABSTRACT

A scheme for intermittent reception of paging signals in a mobile communication system, in which each base station repeatedly transmits a frame which contains: at least one regular reception section having a plurality of paging indication regions provided in corresponding to a plurality of groups, in which a paging presence information for indicating a presence of a paging with respect to a mobile station of a group is set in a paging indication region corresponding to that group when a paging with respect to a mobile station of that group occurs; and a mobile station alerting section having a plurality of identification information setting regions provided in correspondence to a plurality of paging indication regions, in which an identification information of a mobile station called by a paging indicated by a paging indication region is set in an identification information setting region corresponding to that paging indication region. Each mobile station receives this frame by operating a receiver circuit intermittently.

32 Claims, 16 Drawing Sheets

SCHEME FOR INTERMITTENT RECEPTION OF PAGING SIGNALS IN MOBILE COMMUNICATION SYSTEM

BACKGROUND OF THE INVENTION

1. Field of the Invention

The present invention relates to a scheme for intermittent reception of paging signals in a mobile communication system in which a receiver circuit of a mobile station is operated intermittently in order to reduce the battery power consumption at the mobile station in a state of waiting for paging signals from a base station, so that the mobile station receives the paging signals from a base station intermittently. The present invention also relates to a base station apparatus and a mobile station apparatus which are suitable for realizing this scheme for intermittent reception of paging signals in a mobile communication system.

2. Description of the Background Art

In a mobile communication system, in order to carry out the intermittent reception of paging signals at the mobile station, the mobile stations are divided into groups and each mobile station identifies a control channel determined according to the group assigned to this mobile station and a paging channel (PCH) in that control channel, so as to realize the intermittent reception by receiving only the paging channel (PCH) of the own group.

According to the grouping of the mobile stations in the digital mobile communication system called PDC (Personal Digital Cellular) which is currently used in Japan, a frequency number (a radio channel position number) $I_F$ and a PCH group number $I_P$ for specifying a control channel and a paging channel to be identified by the mobile station are defined as follows:

$$n' = (n-1) \bmod (N_C \times N_P) + 1$$

$$I_F = (n'-1) \bmod N_C + 1$$

$$I_P = [(n-1)/N_C] + 1$$

where n is an ID information of the mobile station, $N_C$ is a number of control channels within a zone (cell), $N_P$ is a number of PCH groups within a control channel (superframe), and [X] denotes the maximum integer not exceeding X.

As a concrete example, the grouping in a case of using three control channels as shown in FIG. 1 will be described. In FIG. 1, there are three control channels identified by their frequency numbers (slots) $F_1$ (S), $F_2$ (S) and $F_3$ (S), so that $N_C = 3$. The paging channels (PCH) are divided into nine groups $P_1$ to $P_9$, and a number of PCH groups within each control channel is $N_P = 3$. In this case, for the mobile station ID information $n=9$, the frequency number $I_F$ and the PCH group number $I_P$ can be calculated as follows.

$$n' = (9-1) \bmod (3 \times 3) + 1 = 9$$

$$I_F = (9-1) \bmod (3+1) = 3$$

$$I_P = [(9-1)/3] + 1 = 3$$

Consequently, the control channel to be used by this mobile station is the third one $F_3$ (S), and the PCH group of this mobile station in this control channel is the third one $P_9$. Therefore, it suffices for this mobile station to intermittently receive the paging channel $P_9$ of the ninth group alone.

In other words, the mobile station which is classified into the first group according to its mobile station ID information is required to intermittently receive the paging channel $P_1$ of the first group alone and identify paging signals contained within that paging channel $P_1$, the mobile station which is classified into the second group according to its mobile station ID information is required to intermittently receive the paging channel $P_2$ of the second group and identify the paging signals contained within that paging channel $P_2$, and so on. Note that, in FIG. 1, B represents the broadcast channel (BCCH), and SC represents the signalling control channel (SCCH) for the cell specific information.

As described above, the ON/OFF timing of a receiver circuit of the mobile station in a case of the intermittent reception is specified within a 720 ms superframe formed by 36 frames as shown in a part (a) of FIG. 2. In the PDC, the reception time of the paging signals is partitioned by time-slots and the 3-channel TDMA is used so that, in FIG. 2, the broadcast channel (BCCH) (represented by B in FIG. 2) occupies two time-slots and the paging channel (PCH) (represented by P in FIG. 2) of the mobile station which is classified into a specific group is provided at one timeslot following these broadcast channels.

By means of the grouping within such a superframe, the mobile station turns the power of the receiver circuit ON only during a period corresponding to the broadcast channel B and a period corresponding to the paging channel P of the own group as indicated in a part (b) of FIG. 2, so as to intermittently receive only the paging signals within that paging channel P.

In this case, a time rate for turning the power of the receiver circuit of the mobile station ON, i.e., the intermittent rate, is given in terms of a number of BCCH time-slots $A_b$ and a number of PCH time-slots $A_p$, as follows:

$$\text{Intermittent Rate} = (A_p + A_b) \times 20/720$$
$$= (1+2) \times 20/720$$
$$= 0.083$$

A smaller value of this intermittent rate, i.e., the power ON time rate, implies a smaller rate for the consumption of the battery power of the mobile station.

As described above, the mobile station reduces the battery power consumption by carrying out the intermittent reception of the paging signals, but in order to reduce the battery power consumption further, it is necessary to make the above described intermittent rate as small as possible, and there is still a demand from the mobile station user's viewpoint for a further reduction of the battery power consumption.

SUMMARY OF THE INVENTION

It is therefore an object of the present invention to provide a scheme for intermittent reception of paging signals in a mobile communication system which is capable of making the intermittent rate of the intermittent reception even smaller than has been possible heretofore, so as to reduce the consumption of the battery power of the mobile station as much as possible.

It is another object of the present invention to provide a base station apparatus and a mobile station apparatus which are suitable for realizing the scheme for intermittent reception of paging signals in a mobile communication system according to the present invention.

According to one aspect of the present invention there is provided a method of intermittent reception of paging signals in a mobile communication system formed by mobile stations which are grouped into a plurality of groups and base stations, comprising the steps of: transmitting a frame from each base station repeatedly, said frame containing: at least one regular reception section having a plurality of paging indication regions provided in corresponding to said plurality of groups, in which a paging presence information for indicating a presence of a paging with respect to a mobile station of a group is set in a paging indication region corresponding to said group when a paging with respect to a mobile station of said group occurs; and a mobile station alerting section having a plurality of identification information setting regions provided in correspondence to said plurality of paging indication regions, in which an identification information of a mobile station called by a paging indicated by a paging indication region is set in an identification information setting region corresponding to said paging indication region; and receiving said frame at each mobile station by operating a receiver circuit of said each mobile station intermittently.

According to another aspect of the present invention there is provided a base station apparatus for use in a mobile communication system formed by mobile stations which are grouped into a plurality of groups and base stations, in which each mobile station receives paging signals transmitted from each base station by operating a receiver circuit of said each mobile station intermittently, the base station apparatus comprising: a regular reception section forming circuit for forming at least one regular reception section of a frame to be transmitted, said at least one regular reception section having a plurality of paging indication regions provided in corresponding to said plurality of groups, in which a paging presence information for indicating a presence of a paging with respect to a mobile station of a group is set in a paging indication region corresponding to said group when a paging with respect to a mobile station of said group occurs; a mobile station alerting section forming circuit for forming a mobile station alerting section of said frame, the mobile station alerting section having a plurality of identification information setting regions provided in correspondence to said plurality of paging indication regions, in which an identification information of a mobile station called by a paging indicated by a paging indication region is set in an identification information setting region corresponding to said paging indication region; and a transmission circuit for forming said frame by combining said at least one regular reception section and the mobile station alerting section, and transmitting said frame as the paging signals to the mobile stations repeatedly.

According to another aspect of the present invention there is provided a mobile station apparatus for use in a mobile communication system formed by mobile stations which are grouped into a plurality of groups and base stations, in which each base station is repeatedly transmitting a frame which contains: (1) at least one regular reception section having a plurality of paging indication regions provided in corresponding to said plurality of groups, in which a paging presence information for indicating a presence of a paging with respect to a mobile station of a group is set in a paging indication region corresponding to said group when a paging with respect to a mobile station of said group occurs; and (2) a mobile station alerting section having a plurality of identification information setting regions provided in correspondence to said plurality of paging indication regions, in which an identification information of a mobile station called by a paging indicated by a paging indication region is set in an identification information setting region corresponding to said paging indication region; the mobile station apparatus comprising: a battery for providing a power; a receiver circuit for receiving said frame transmitted from each base station and obtaining an information in the paging indication region and an information in the identification information setting region, by being supplied with the power provided by the battery; and a reception ON/OFF judging circuit for intermittently operating the receiver circuit to receive an information in at least one paging indication region corresponding to one group to which the mobile station apparatus belongs, by selectively supplying the power from the battery to the receiver circuit during a period of time corresponding to said at least one paging indication region in the regular reception section of said frame, and when the information in said at least one paging indication region is the paging presence information, intermittently operating the receiver circuit to make an access to an information in one identification information setting region corresponding to said at least one paging indication region, by selectively supplying the power from the battery to the receiver circuit during a period of time corresponding to said one identification information setting region in the mobile station alerting section of said frame; and a control circuit for receiving the information in the identification information setting region obtained by the receiver circuit, and carrying out a paging connection processing when the information in the identification information setting region contains an identification information of the mobile station apparatus.

Other features and advantages of the present invention will become apparent from the following description taken in conjunction with the accompanying drawings.

DETAILED DESCRIPTION OF THE PREFERRED EMBODIMENTS

Referring now to FIG. 3 to FIG. 6, the first embodiment of a scheme for intermittent reception of paging signals in a mobile communication system according to the present invention will be described in detail.

Figure 1:
FIG. 1 is a diagram showing exemplary control channels for explaining a grouping of mobile stations in a conventional mobile communication system.
Figure 2:
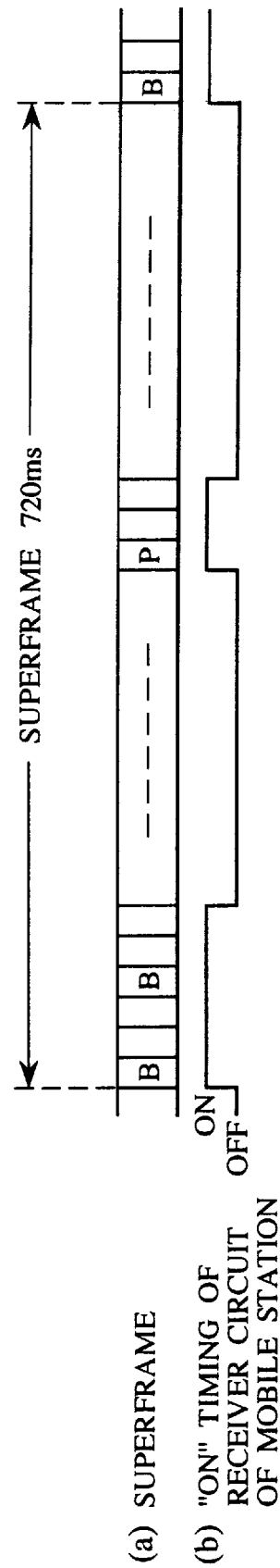
FIG. 2 is a diagram showing a configuration of a superframe and intermittent reception timings in a conventional mobile communication system.
Figure 3:
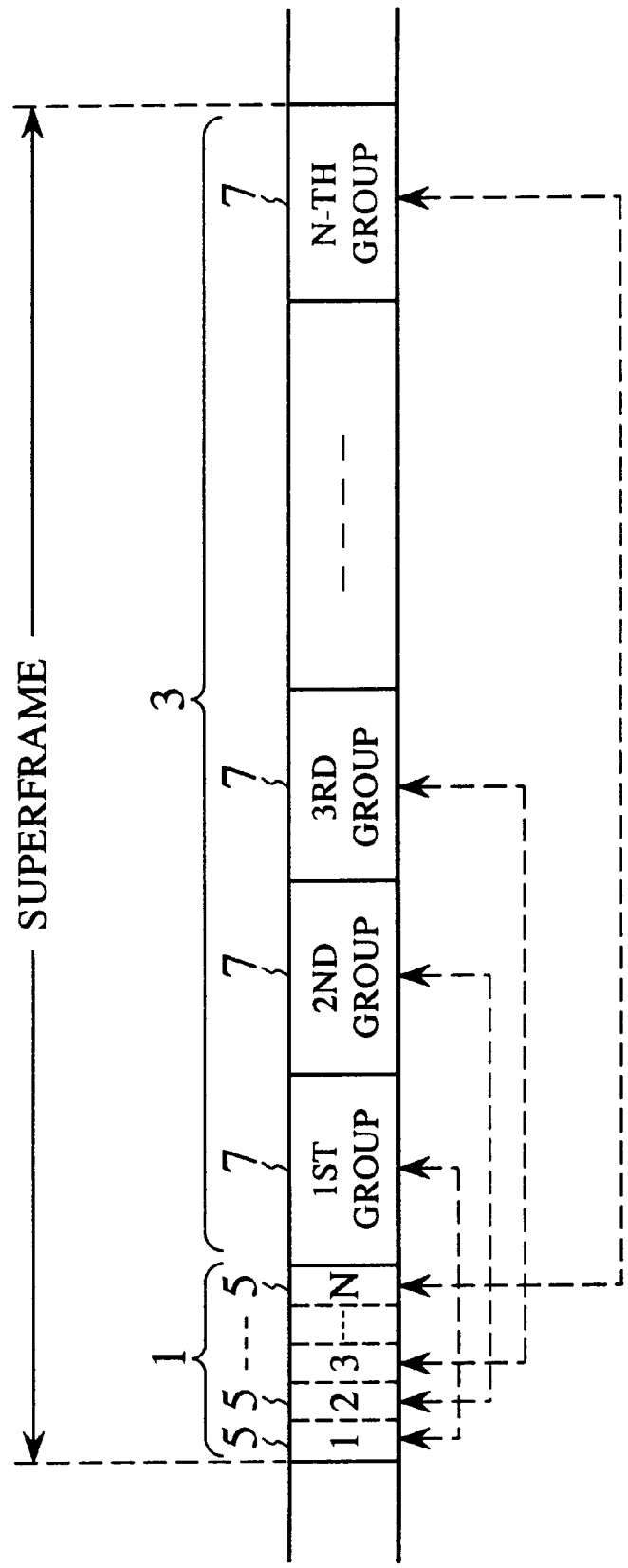
FIG. 3 is a diagram showing a configuration of a superframe in the first embodiment of the present invention.

FIG. 3 shows a configuration of a superframe on a physical channel for providing a downlink control channel for alerting which is to be transmitted from a base station to a mobile station in this first embodiment. This superframe of FIG. 3 largely comprises a regular reception section 1 and a mobile station alerting section 3. The regular reception section 1 has a plurality (N in this embodiment) of paging indication regions 5, while the mobile station alerting section 3 has a plurality (N in this embodiment) of identification information setting regions 7 in correspondence to a plurality of paging indication regions 5 of the regular reception section 1.

The mobile stations to be used in the mobile communication system of this embodiment are classified into a plurality (N in this embodiment) of groups similarly as described in the description of the background art section above. Here, the grouping can be made similarly as in a case of the PDC described above, but any other suitable manner of grouping may be used instead, if desired.

In a case shown in FIG. 3, the mobile stations are divided into N groups, and N paging indication regions 5 constituting the regular reception section 1 are provided in correspondence to these N groups. A paging presence information is set to each paging indication region 5 when a paging to a mobile station of a corresponding group occurs, so as to indicate an occurrence of a paging to a mobile station of that group.

More specifically, when a paging to a mobile station belonging to the first group occurs, the paging presence information is set to the paging indication region 5 for this first group. Likewise, when a paging to a mobile station belonging to the second group occurs, the paging presence information is set to the paging indication region 5 for this second group, and so on. Similarly, when a paging to a mobile station belonging to the N-th group occurs, the paging presence information is set to the paging indication region 5 for this N-th group.

Note here that it suffices for the paging presence information to simply indicate an occurrence of a paging, so that the paging presence information can be a very short one. For example, the paging presence information can be given in one bit.

On the other hand, N identification information setting regions 7 constituting the mobile station alerting section 3 are provided in correspondence to a plurality of paging indication sections 5 of the regular reception section 1, and when the paging presence information is set to a certain paging indication region 5, an identification information of a mobile station with respect to which the paging indicated by the paging presence information occurred is set to the identification information setting region 7 corresponding to that certain paging indication region 5.

More specifically, when a paging with respect to a mobile station belonging to the first group occurs and the paging presence information is set to the paging indication region 5 for this first group, an identification information of a mobile station with respect to which that paging occurred is set to the identification information setting region 7 for the first group corresponding to the paging indication region 5 for the first group as the paging signal. Likewise, when a paging with respect to a mobile station belonging to the second group occurs and the paging presence information is set to the paging indication region 5 for this second group, an identification information of a mobile station with respect to which that a paging occurred is set to the identification information setting region 7 for the second group corresponding to the paging indication region 5 for the second group, and so on. Similarly, when a paging with respect to a mobile station belonging to the N-th group occurs and the paging presence information is set to the paging indication region 5 for this N-th group, an identification information of a mobile station with respect to which that paging occurred is set to the identification information setting region 7 for the N-th group corresponding to the paging indication region 5 for the N-th group.

The superframe in a configuration of FIG. 3 as described above is repeatedly transmitted from a base station. Then, a mobile station in a waiting state receives this superframe and judges whether there is a paging for that mobile station or not according to the received superframe.

More specifically, the mobile station is configured to regularly receive only the paging indication region 5 corresponding to the own group to which that mobile station belongs from the regular reception section 1 of the superframe, and judges whether or not a paging presence information is set to that received paging indication region 5. When the paging presence information is set to that received paging indication region 5, the mobile station next receives only the identification information setting region 7 corresponding to the own group to which that mobile station belongs from the mobile station alerting section 3 of the superframe, and obtains the paging signal by extracting the identification information of a mobile station from that received identification information setting region 7. When the extracted identification information is the identification information of that mobile station itself, the mobile station detects the occurrence of the paging.

Note that the mobile station is configured to not to receive the mobile station alerting section 3 at all when the mobile station receives the paging indication region 5 corresponding to the own group to which that mobile station belongs and there is no paging presence information in that paging indication region 5, so that it suffices for the mobile station to receive only the paging indication region 5 corresponding to the own group to which that mobile station belongs when there is no paging presence information, that is, when there is no paging. Consequently, the power of the receiver circuit of the mobile station is turned ON only during a period of time corresponding to that paging indication region 5, so that the intermittent rate is very small, and therefore the consumption of the battery of the mobile station can be reduced as much as possible.

On the other hand, even when there is a paging, the mobile station is required to receive only the paging indication region 5 and the identification information setting region 7 corresponding to the own group to which that mobile station belongs. Consequently, the power of the receiver circuit of the mobile station is turned ON only during periods of time corresponding to these paging indication region 5 and identification information setting region 7, so that the intermittent rate is still very small, and therefore the consumption of the battery of the mobile station can be reduced as much as possible.

Now, with references to FIG. 4 and FIG. 5, a configuration of a base station for repeatedly transmitting the above described superframe and a configuration of a mobile station for receiving the above described superframe will be described.

Figure 4:
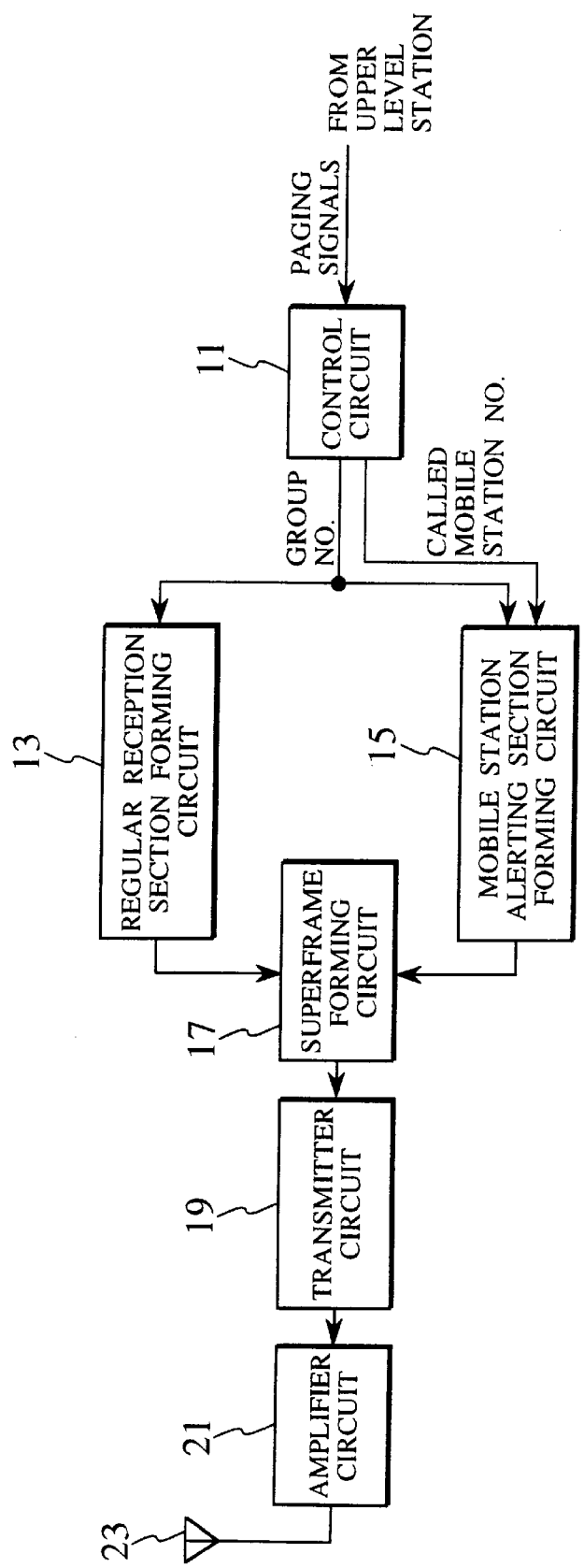
FIG. 4 is a block diagram of a base station for transmitting the superframe of FIG. 3 in the first embodiment of the present invention.

FIG. 4 shows a configuration of the base station according to this first embodiment.

This base station of FIG. 4 has a control circuit 11 for receiving the paging signal from an upper level station and calculating a group number of a called mobile station from a called mobile station identification information in the received paging signal, while controlling an overall operation of the base station. The group number calculated by the control circuit 11 is supplied to a regular reception section forming circuit 13 and a mobile station alerting section forming circuit 15, while the called mobile station identification information is also supplied to the mobile station alerting section forming circuit 15.

The regular reception section forming circuit 13 sets the paging presence information into the paging indication region 5 of the regular reception section 1 corresponding to the group number supplied from the control circuit 11, so as to form a signal for the regular reception section 1 of the superframe. The setting of the paging presence information into the paging indication region 5 is carried out by erecting "1" bit in one paging indication region 5 while setting "0" bits to the other paging indication regions 5, for example.

The mobile station alerting section forming circuit 15 sets the called mobile station identification information supplied from the control circuit 11 into the identification information setting region 7 of the mobile station alerting section 3 corresponding to the group number supplied from the control circuit 11, while setting "0" to all the other identification information setting regions 7, so as to form a signal for the mobile station alerting section 3 of the superframe.

The signal for the regular reception section 1 formed by the regular reception section forming circuit 13 and the signal for the mobile station alerting section 3 formed by the mobile station alerting section forming circuit 15 are supplied to a superframe forming circuit 17. This superframe forming circuit 17 combines the supplied regular reception section 1 and the supplied mobile station alerting section 3 together, so as to form the superframe in a configuration of FIG. 3.

The superframe formed by the superframe forming circuit 17 is supplied to a transmitter circuit 19 which carries out the encoding and modulation processing with respect to the supplied superframe so as to generate a radio transmission signal. This radio transmission signal is then amplified by an amplifier circuit 21, and transmitted toward the mobile stations from an antenna 23. Note that, in the generation of the radio transmission signal at the transmitter circuit 19, it should be obvious that the signal is generated so as not to transmit those groups with all "0" bits in the mobile station alerting section 3 of the superframe.

Figure 5:
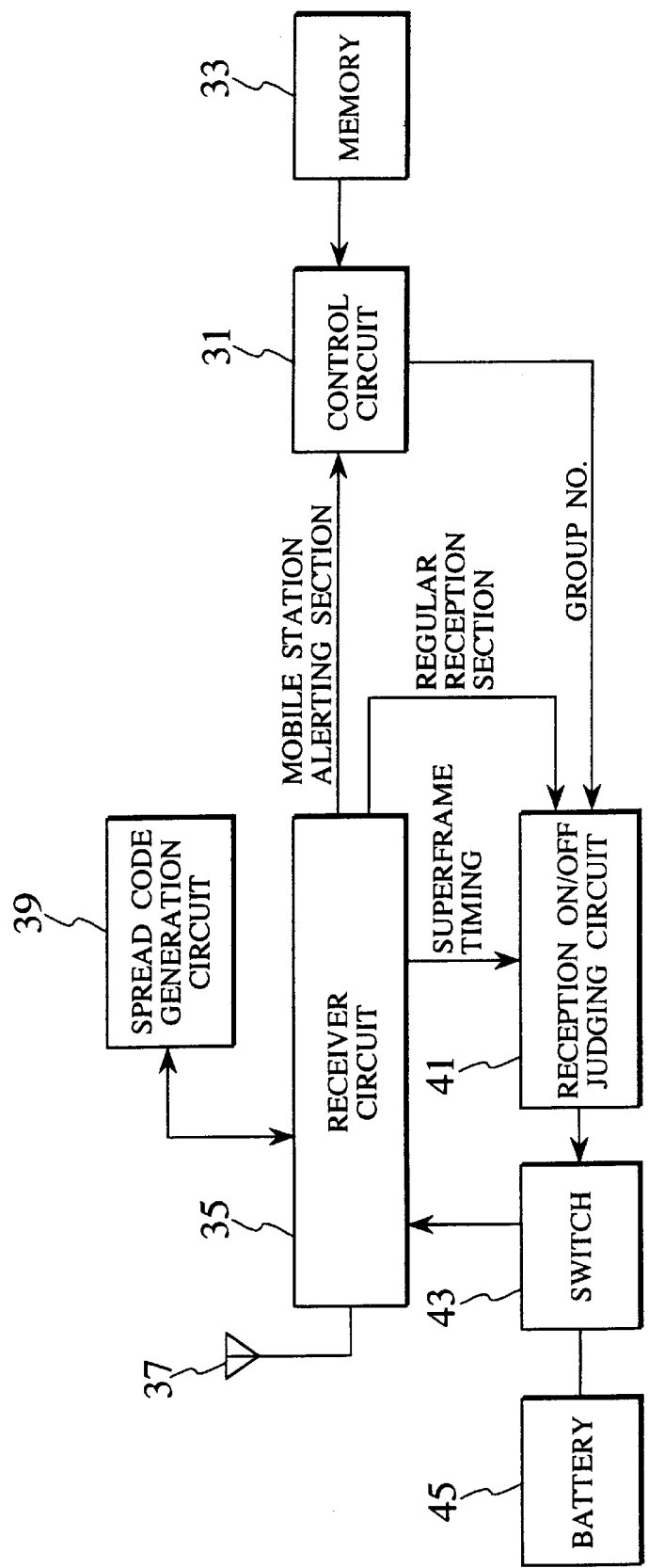
FIG. 5 is a block diagram of a mobile station for receiving the superframe of FIG. 3 in the first embodiment of the present invention.

FIG. 5 shows a configuration of the mobile station according to this first embodiment.

This mobile station of FIG. 5 has a control circuit 31 for controlling an overall operation of the mobile station and a memory 33 for storing the own mobile station identification information and other necessary information. The control circuit 31 reads out the own mobile station identification information from the memory 33 when the power of the mobile station is turned ON, and calculates a group number of the group to be waited from that own mobile station identification information. The calculated group number is then supplied to a reception ON/OFF judging circuit 41.

This mobile station of FIG. 5 also has an antenna 37 for receiving the radio signal from the base station. The signal received by this antenna 37 is supplied to a receiver circuit 35 which carries out the demodulation and decoding processing with respect to the received signal supplied from the antenna 37, so as to generate the superframe from the received signal. The receiver circuit 35 supplies the superframe timing and the signal for the regular reception section 1 of the superframe to the reception ON/OFF judging circuit 41, while supplying the signal for the mobile station alerting section 3, i.e., the called mobile station identification information in the mobile station alerting section 3, of the superframe to the control circuit 31.

The reception ON/OFF judging circuit 41 judges ON/OFF of the power supply to the receiver circuit 35, and controls a switch 43 so as to control the power supply from a battery to the receiver circuit 35 via the switch 43. Also, when the power of the mobile station is turned ON, the reception ON/OFF judging circuit 41 controls the switch 43 so that the receiver circuit 35 is set in ON state via the switch 43 and the superframe timing of the superframe received by the receiver circuit 35 will be supplied to the reception ON/OFF judging circuit 41.

In addition, the reception ON/OFF judging circuit 41 judges a timing for the pertinent paging indication region 5 of the regular reception section 1 and a timing for the pertinent identification information setting region 7 of the mobile station alerting section 3 with respect to the superframe timing at which the power supply to the receiver circuit 35 is to be turned ON, according to the group number received from the control circuit 31. Then, the reception ON/OFF judging circuit 41 controls the switch 43 at the judged timing of the pertinent paging indication region 5 of the regular reception section 1 so as to supply the power from the battery 45 to the receiver circuit 35 via the switch 43 and thereby set the receiver circuit 35 in ON state, while setting the receiver circuit 35 in OFF state at the other timings.

Namely, the reception ON/OFF judging circuit 41 supplies the power from the battery 45 to the receiver circuit 35 via the switch 43 at the timing of the paging indication region 5 corresponding to the supplied group number within the regular reception section 1, so as to set the receiver circuit 35 in ON state for receiving that paging indication region 5, and then judges whether or not the paging presence information is provided in that paging indication region 5 of the regular reception section 1 obtained from the receiver circuit 35.

Then, only when it is judged that the paging presence information is provided in that paging indication region 5 of the regular reception section 1 of the superframe, the reception ON/OFF judging circuit 41 controls the switch 43 again at the timing of the identification information setting region 7 corresponding to the supplied group number within the mobile station alerting section 3, so as to supply the power from the battery 45 to the receiver circuit 35 via the switch 43 and thereby set the receiver circuit 35 in ON state for receiving that identification information setting region 7. The received information of the identification information setting region 7, i.e., the mobile station identification information indicating the paging signal, is supplied to the control circuit 31.

When the own mobile station identification information is found in this information of the identification information setting region 7, the control circuit 31 judges that there is a paging with respect to this mobile station, and proceeds to the paging connection processing.

Also, a spread code generation circuit 39 connected to the receiver circuit 35 generates the spread code used in the demodulation carried out at the receiver circuit 35. The spread code generation circuit 39 continues to generate the spread code even while the power of the receiver circuit 35 is turned OFF, so that the synchronization can be established as soon as the power of the receiver circuit 35 is turned ON. The spread code generation circuit 39 also carries out the adjustment of the spread code generation timing with respect to the receiver circuit 35 during a period of time in which the receiver circuit 35 is in ON state.

Next, with reference to the flow chart of FIG. 6, the operation of the mobile station of FIG. 5 will be described.

Figure 6:
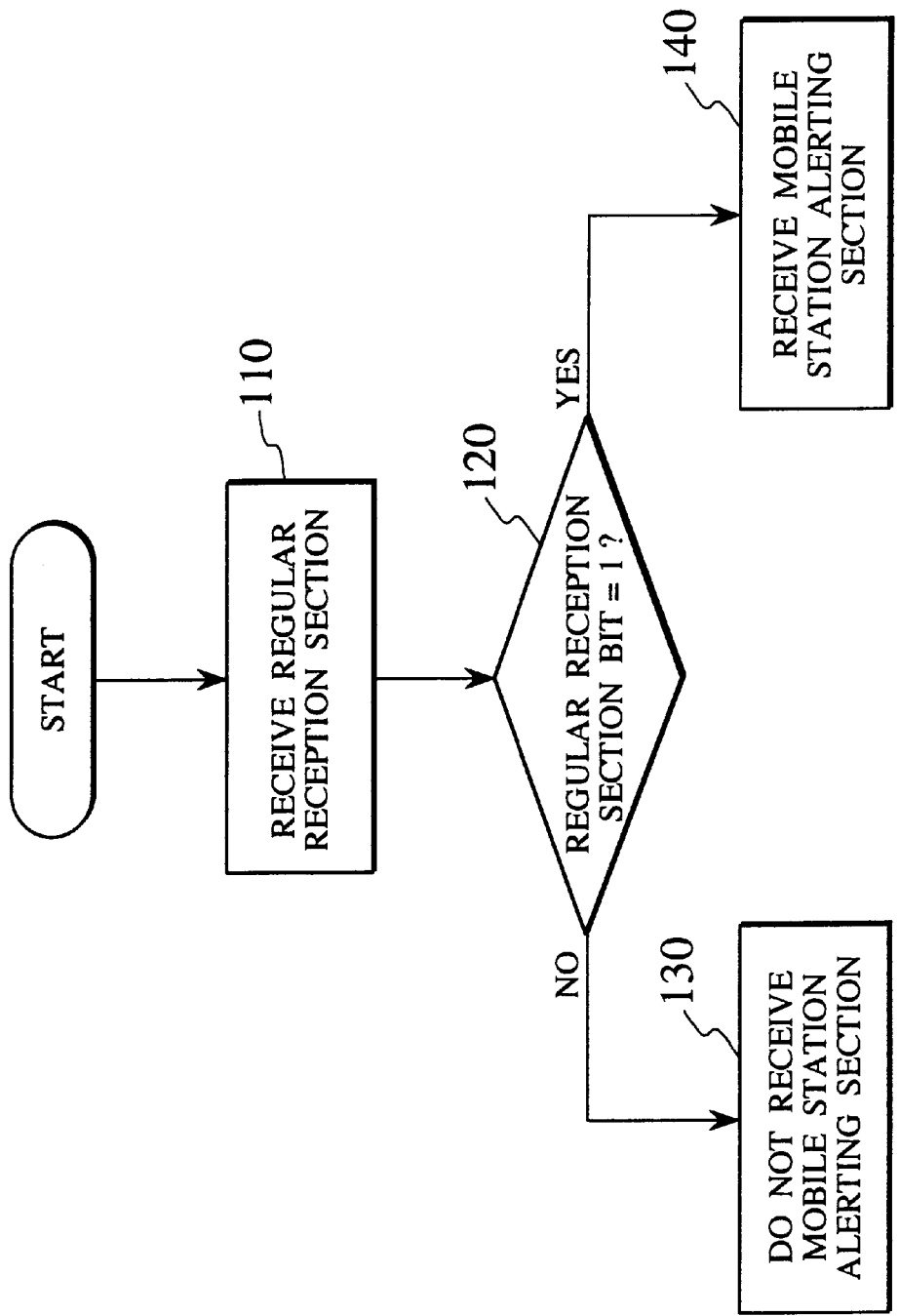
FIG. 6 is a flow chart for the intermittent reception operation of the mobile station of FIG. 5 in the first embodiment of the present invention.

According to FIG. 6, the mobile station activates the receiver circuit 35 by supplying the power from the battery 45 to the receiver circuit 35 via the switch 43 under the control of the reception ON/OFF judging circuit 41, only during a period of time corresponding to the paging indication region 5 of the regular reception section 1 of the superframe which corresponds to the group number obtained from the mobile station identification information, so as to receive the information of that paging indication region 5 (step 110).

Then, the mobile station judges whether the received information of the paging indication region 5 of the regular reception section 1 is equal to "1" or not (step 120).

When the received information of the paging indication region 5 of the regular reception section 1 is not equal to "1", it implies that there is no paging presence information, so that the mobile station alerting section 3 of the superframe is not received (step 130), and the next superframe is awaited while the receiver circuit 35 remains in OFF state.

When the received information of the paging indication region 5 of the regular reception section 1 is equal to "1", it implies that there is a paging presence information, so that the receiver circuit 35 is set in ON state, so as to receive the information of the identification information setting region 7 of the mobile station alerting section 3 which corresponds to that paging indication region 5 (step 140). Then, when the own mobile station identification information is found in the received information of the identification information setting region 7, it is judged that there is a paging with respect to the own mobile station.

Figure 7:
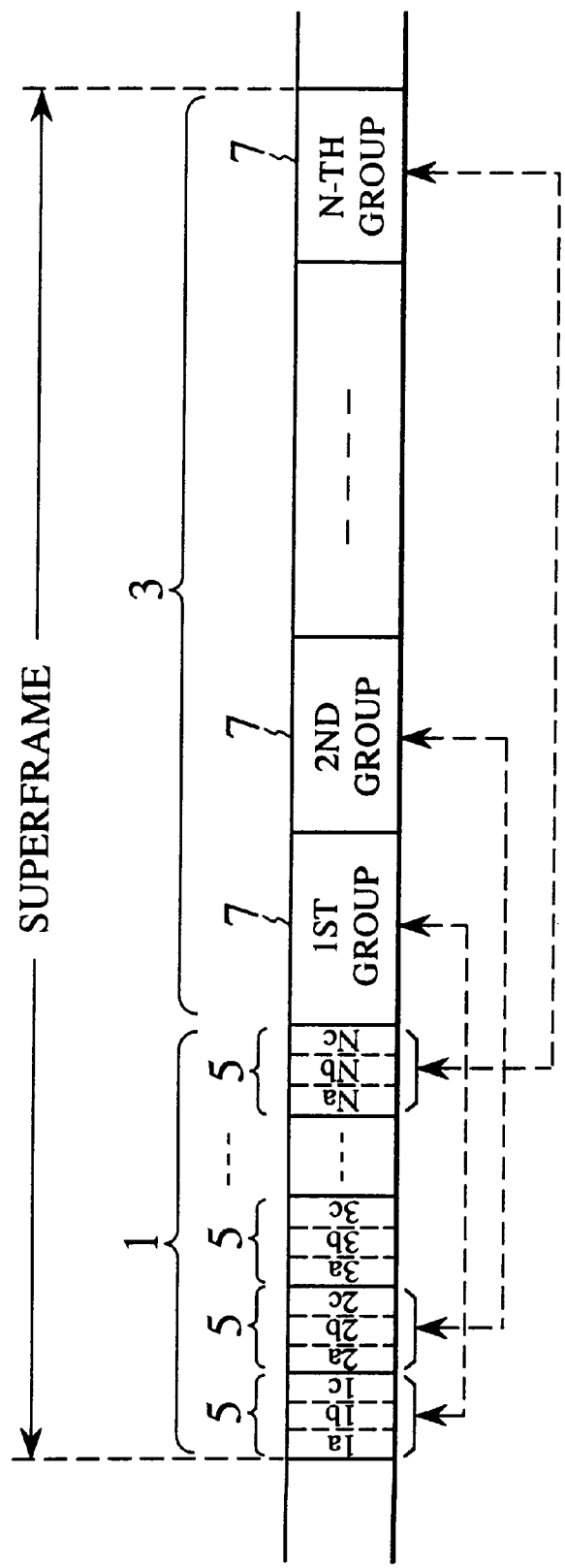
FIG. 7 is a diagram showing a configuration of a superframe in the second embodiment of the present invention.

Referring now to FIG. 7, the second embodiment of a scheme for intermittent reception of paging signals in a mobile communication system according to the present invention will be described in detail.

FIG. 7 shows a configuration of a superframe according to the second embodiment, which differs from the configuration of FIG. 3 in that a plurality of regions are provided in each paging indication region 5 of the regular reception section 1. The rest of this configuration of FIG. 7 is identical to that of FIG. 3.

Namely, in the superframe of FIG. 7, each paging indication region 5 of the regular reception section 1 is formed by three regions, so that the paging indication region 5 for the first group comprises three regions 1a, 1b and 1c. Likewise, the paging indication region 5 for the second group comprises three regions 2a, 2b and 2c, and so on. Similarly, the paging indication region 5 for the N-th group comprises three regions Na, Nb and Nc.

Using this paging indication region 5 formed by a plurality of regions, it is possible to judge whether the paging with respect to the corresponding group occurred or not according to the decision by majority based on a number of paging presence information set in these plurality of regions, for example. It is also possible to judge that a paging with respect to the corresponding group occurred when at least one paging presence information is set in these plurality of regions. Thus, the reliability of the regular reception section 1 can be improved by using this paging indication region 5 formed by a plurality of regions.

For example, when the paging presence information is given by a "1" bit and bits in the three regions constituting the paging indication region 5 are "111", it can be judged that there is a paging so that the mobile station is controlled to receive the mobile station alerting section 3 of the superframe a well. When bits in the three regions constituting the paging indication region 5 are "101", i.e., a case of two "1" bits, for example, it can be judged that there is a paging according to the decision by majority. When bits in the three regions constituting the paging indication region 5 are "100", i.e., a case of one "1" bit, for example, it can be judged that there is no paging and one "1" bit is due to an error, so that the mobile station is controlled not to receive the mobile station alerting section 3 of the superframe. Alternatively, in a case of one "1" bit, it can be judged that there is a paging in order to secure the safety.

Figure 8:
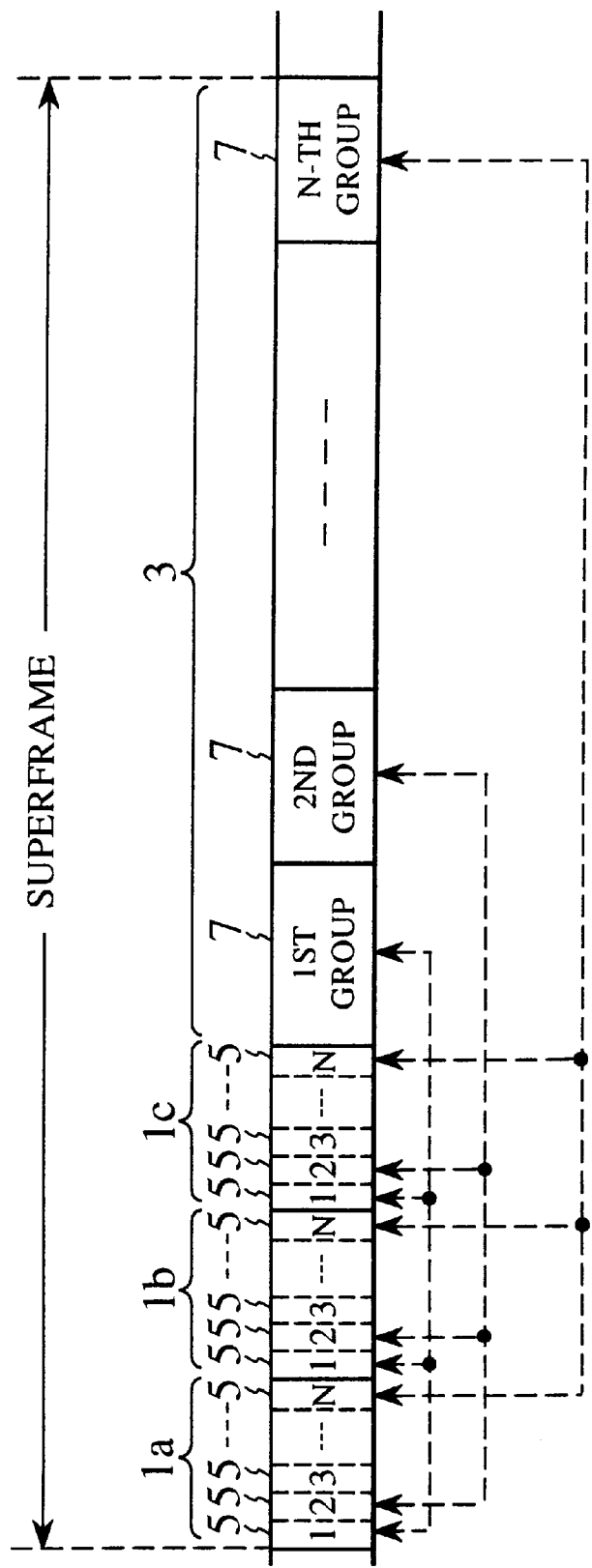
FIG. 8 is a diagram showing a configuration of a superframe in the third embodiment of the present invention.
Figure 9:
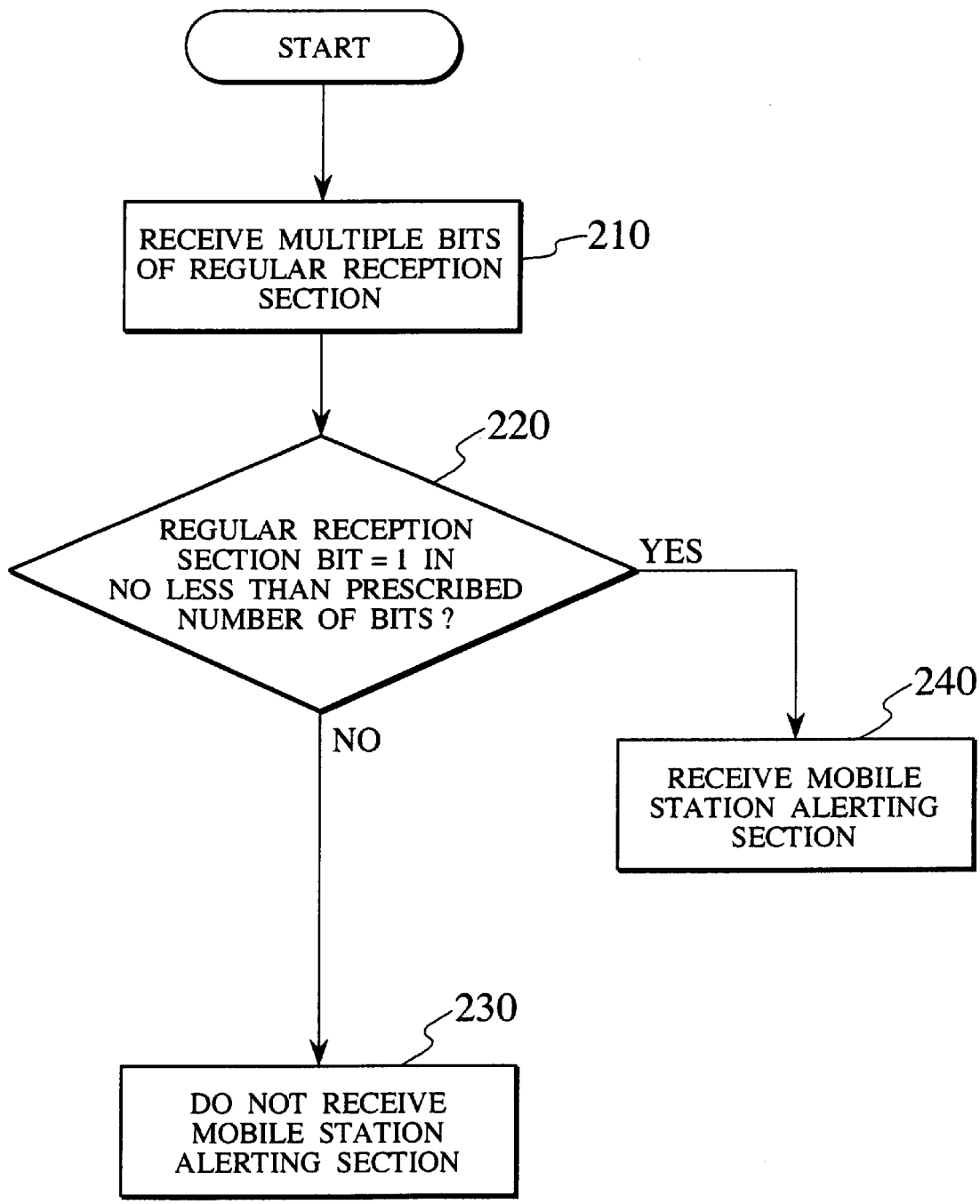
FIG. 9 is a flow chart for the intermittent reception operation of the mobile station in the third embodiment of the present invention.

Referring now to FIG. 8 and FIG. 9, the third embodiment of a scheme for intermittent reception of paging signals in a-mobile communication system according to the present invention will be described in detail.

FIG. 8 shows a configuration of a superframe according to the third embodiment, which differs from the configuration of FIG. 3 in that three sets of regular reception sections 1a, 1b and 1c are provided where each regular reception section comprises a plurality of paging indication regions 5. The rest of this configuration of FIG. 8 is identical to that of FIG. 3.

Namely, in the superframe of FIG. 8, a plurality of paging indication regions 5 are provided for each group, in a plurality of regular reception sections such as the first regular reception section 1a, the second regular reception section 1b and the third regular reception section 1c. Using these plurality of paging indication regions 5, it is possible to judge whether the paging with respect to the corresponding group occurred or not according to the decision by majority based on a number of paging presence information set in these plurality of paging indication regions 5, for example. It is also possible to judge that a paging with respect to the corresponding group occurred when at least one paging presence information is set in these plurality of paging indication regions 5. Thus, similarly as in a configuration of FIG. 7, the reliability of the regular reception section 1 can be improved by using these paging indication regions 5 provided in a plurality of regular reception sections 1.

Next, with reference to the flow chart of FIG. 9, the operation of the mobile station in a case of using the superframe in a configuration of FIG. 7 or FIG. 8 will be described.

According to FIG. 9, the mobile station activates the receiver circuit 35 only during periods of time corresponding to a plurality of paging indication regions 5 in a plurality of regular reception sections 1a, 1b and 1c of the superframe which correspond to the group number obtained from the mobile station identification information, so as to receive the information of these plurality of paging indication regions 5 (step 210).

Then, the mobile station judges whether no less than a prescribed number of the received information of these plurality of paging indication regions 5 of the regular reception sections 1a, 1b and 1c are equal to "1" or not, that is, the decision by majority as to whether no less than a prescribed number of the received information have the paging presence information or not (step 220).

When no less than a prescribed number of the received information of these plurality of paging indication regions 5 of the regular reception sections 1a, 1b and 1c are not equal to "1", the mobile station alerting section 3 of the superframe is not received (step 230), and the next superframe is awaited while the receiver circuit 35 remains in OFF state.

When no less than a prescribed number of the received information of these plurality of paging indication regions 5 of the regular reception sections 1a, 1b and 1c are equal to "1", the receiver circuit 35 is set in ON state, so as to receive the information of the identification information setting region 7 of the mobile station alerting section 3 which corresponds to these paging indication regions 5 (step 240). Then, when the own mobile station identification information is found in the received information of the identification information setting region 7, it is judged that there is a paging with respect to the own mobile station.

In this processing, a rate for overlooking the paging for the mobile station can be made lower by using the smaller prescribed number, so that it becomes possible to carry out the paging processing surely. Also, a probability for receiving the identification information setting region by error can be made lower by using the larger prescribed number, so that it becomes possible to avoid a wasteful consumption of the battery power.

Figure 10:
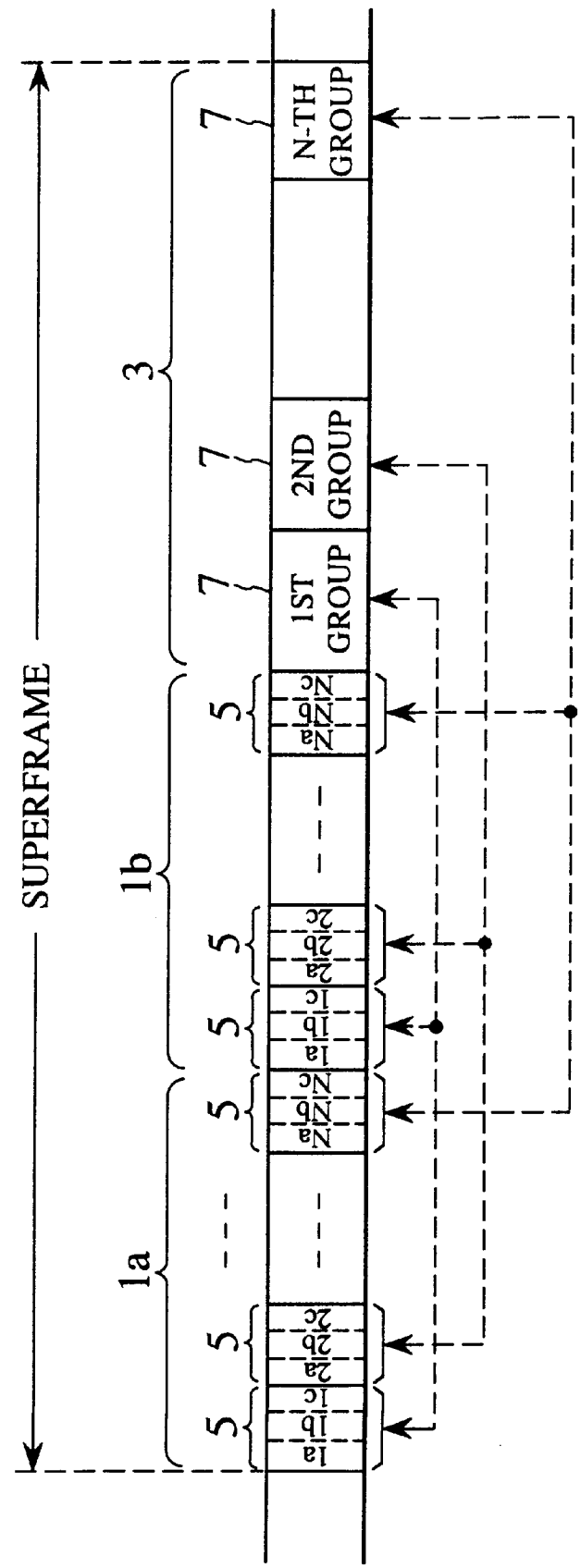
FIG. 10 is a diagram showing a configuration of a superframe in the fourth embodiment of the present invention.
Figure 11:
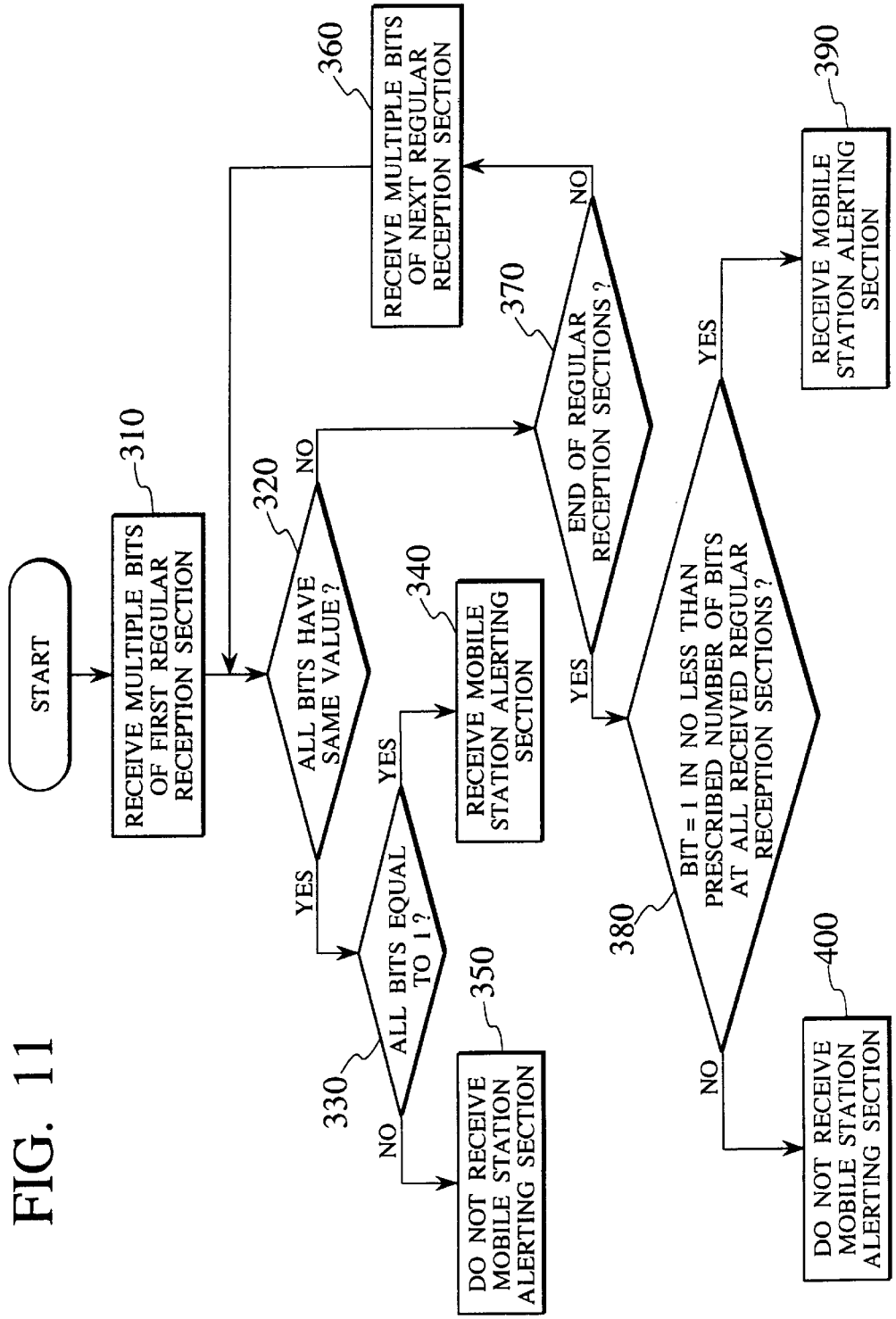
FIG. 11 is a flow chart for the intermittent reception operation of the mobile station in the fourth embodiment of the present invention.

Referring now to FIG. 10 and FIG. 11, the fourth embodiment of a scheme for intermittent reception of paging signals in a mobile communication system according to the present invention will be described in detail.

FIG. 10 shows a configuration of a superframe according to the fourth embodiment, which differs from the configuration of FIG. 3 in that two sets of regular reception sections 1a and 1b are provided where each regular reception section comprises a plurality of paging indication regions 5, and a plurality of regions are provided in each paging indication region 5. The rest of this configuration of FIG. 10 is identical to that of FIG. 3. In other words, this fourth embodiment is a hybrid of the second embodiment of FIG. 7 and third embodiment of FIG. 8 described above.

Namely, in the regular reception sections 1a and 1b of the superframe of FIG. 10, when all bits in three regions of the paging indication region 5 of the first regular reception section 1a are equal to "1", it is judged that the paging with respect to the corresponding group occurred, so that the mobile station is controlled to receive the mobile station alerting section 3. When all bits in three regions of the paging indication region 5 of the first regular reception section 1a are not equal to "1", the paging indication region 5 of the second regular reception section 1b is also received. In a general case of using a plurality of regular reception sections, the reception of the regular reception section is repeated for a plurality of times until all bits in three regions of the paging indication region 5 have the same value.

When the end of the regular reception sections is reached without finding all bits in three regions of the paging indication region 5 equal to the same value, the mobile station can be controlled to receive the mobile station alerting section 3 as long as at least one bit has a value "1", in a case where it is desired to detect the paging surely. Alternatively, the mobile station can be controlled not to receive the mobile station alerting section 3 unless all bits have a value "1" in a case where it is desired to improve the intermittent rate rather than the safety.

Next, with reference to the flow chart of FIG. 11, the operation of the mobile station in a case of using the superframe in a configuration of FIG. 10 will be described.

According to FIG. 11, the mobile station receives multiple bits in a plurality of regions of the paging indication region 5 of the first regular reception section 1a (step 310), and judges whether all these multiple bits have the same value or not (step 320).

When all these multiple bits have the same value, whether all these multiple bits are equal to "1" or not is judged (step 330), and when all these multiple bits are equal to "1", the corresponding mobile station alerting section 3 of the superframe is received (step 340), whereas when all these multiple bits are equal to "0", the mobile station alerting section 3 is not received (step 350).

Also, when it is judged that all these multiple bits do not have the same value at the step 320, whether the end of the regular reception sections is reached or not is judged (step 370), and if not, multiple bits in a plurality of regions of the paging indication region 5 of the next regular reception section 1b are received (step 360) and the operation returns to the step 320.

A plurality of regular reception sections in the superframe is sequentially received in this manner until all the multiple bits are found to have the same value or until the end of the regular reception sections in the superframe is reached, and the steps 320 to 350 described above are carried out for each received regular reception section.

When it is judged that the end of the regular reception sections in the superframe is reached at the step 370, whether no less than a prescribed number of bits in the paging indication regions 5 of all the regular reception sections received so far are equal to "1" or not is judged (step 380). If so, it is judged that the paging occurred, so that the corresponding identification information setting region 7 of the mobile station alerting section 3 is received (step 390), whereas otherwise, the mobile station alerting section 3 is not received (step 400), and the next superframe is awaited while the receiver circuit 35 remain in OFF state.

Figure 12:
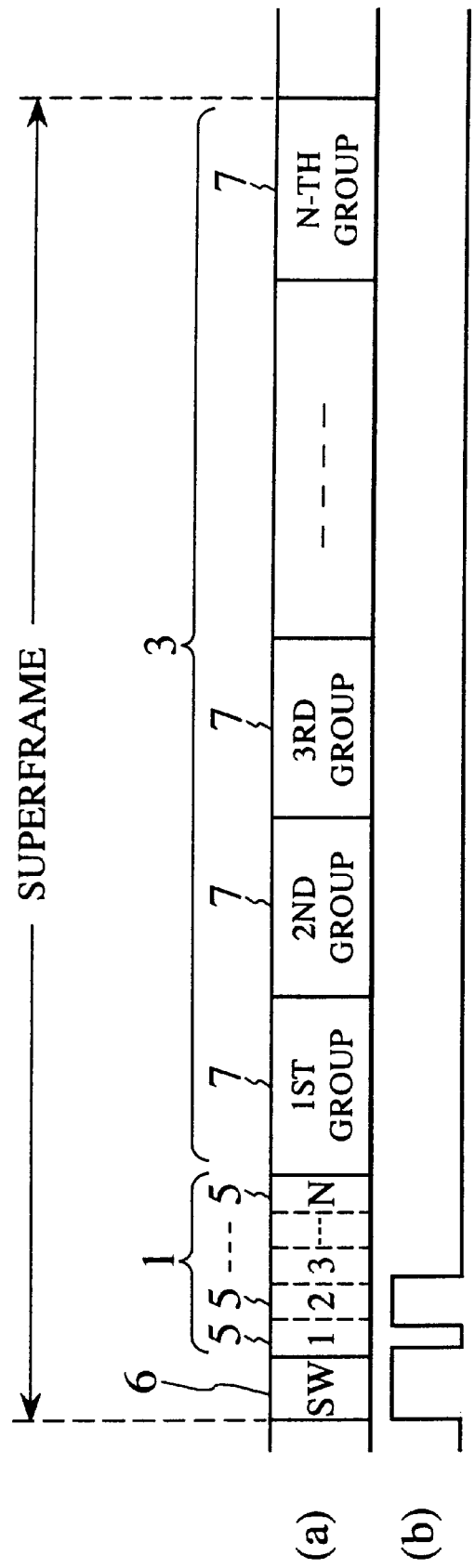
FIG. 12 is a diagram showing a configuration of a superframe and intermittent reception timings in the fifth embodiment of the present invention.

Referring now to FIG. 12, the fifth embodiment of a scheme for intermittent reception of paging signals in a mobile communication system according to the present invention will be described in detail.

FIG. 12 shows a configuration of a superframe according to the fifth embodiment, which differs from the configuration of FIG. 3 in that a synchronization word (SW) 6 for maintaining the synchronization is inserted immediately in front of the regular reception section 1. The rest of this configuration of FIG. 12 is identical to that of FIG. 3.

When the mobile station receives the regular reception section 1 of such a superframe which has the synchronization word (SW) 6, as indicated in a part (b) of FIG. 12, the receiver circuit 35 of the mobile station is set in ON state not just at a timing of the corresponding paging indication region 5 of the regular reception section 1 but also at a timing of the synchronization word (SW) 6 as well, so as to receive the synchronization word (SW) 6 and the corresponding paging indication region 5 of the regular reception section 1, and compensate the synchronization by using the received synchronization word (SW) 6.

Namely, in receiving the superframe which is repeatedly transmitted from the base station, it is necessary for the mobile station to have a timing for receiving the superframe which is always synchronized, but a timing for receiving the superframe tends to be displaced when the mobile station moves and the propagation delay changes. Consequently, in order to compensate this timing displacement, the synchronization word (SW) 6 in the known pattern is inserted into the superframe. When this synchronization word (SW) 6 in the known pattern is received, the mobile station judges that the timing is right when the received pattern matches with the known pattern, and is controlled to receive the corresponding identification information setting region 7 of the mobile station alerting section 3 by using a position of this synchronization word (SW) 6 as a reference.

Figure 13:
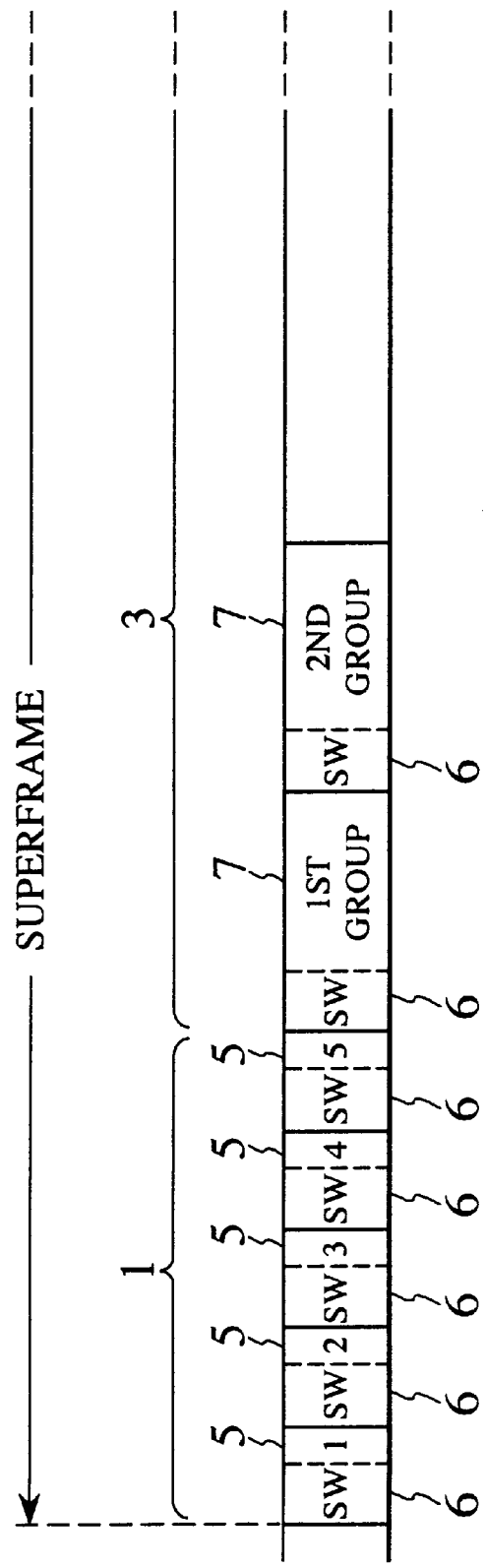
FIG. 13 is a diagram showing a configuration of a superframe in the sixth embodiment of the present invention.

Referring now to FIG. 13, the sixth embodiment of a scheme for intermittent reception of paging signals in a mobile communication system according to the present invention will be described in detail.

FIG. 13 shows a configuration of a superframe according to the sixth embodiment, which differs from the configuration of FIG. 3 in that a synchronization word (SW) 6 is inserted immediately in front of each paging indication region 5 of the regular reception section 1 and each identification information setting region 7 of the mobile station alerting section 3, so as to further improve the synchronization precision. The rest of this configuration of FIG. 13 is identical to that of FIG. 3.

By setting the synchronization word (SW) 6 with respect to each reception unit, that is, each paging indication region 5 and each identification information setting region 7 as shown in FIG. 13, it is possible to improve the synchronization precision. For example, in a case of FIG. 12, the timing may be displaced during a period of time between the reception of the synchronization word (SW) 6 and the reception of the signal for the N-th group when the mobile station moves during this period of time, because the signal for the N-th group is quite separated from the synchronization word (SW) 6 in a configuration of FIG. 12. In this regard, using a configuration of FIG. 13, it is possible to compensate such a timing displacement as well.

Figure 14:
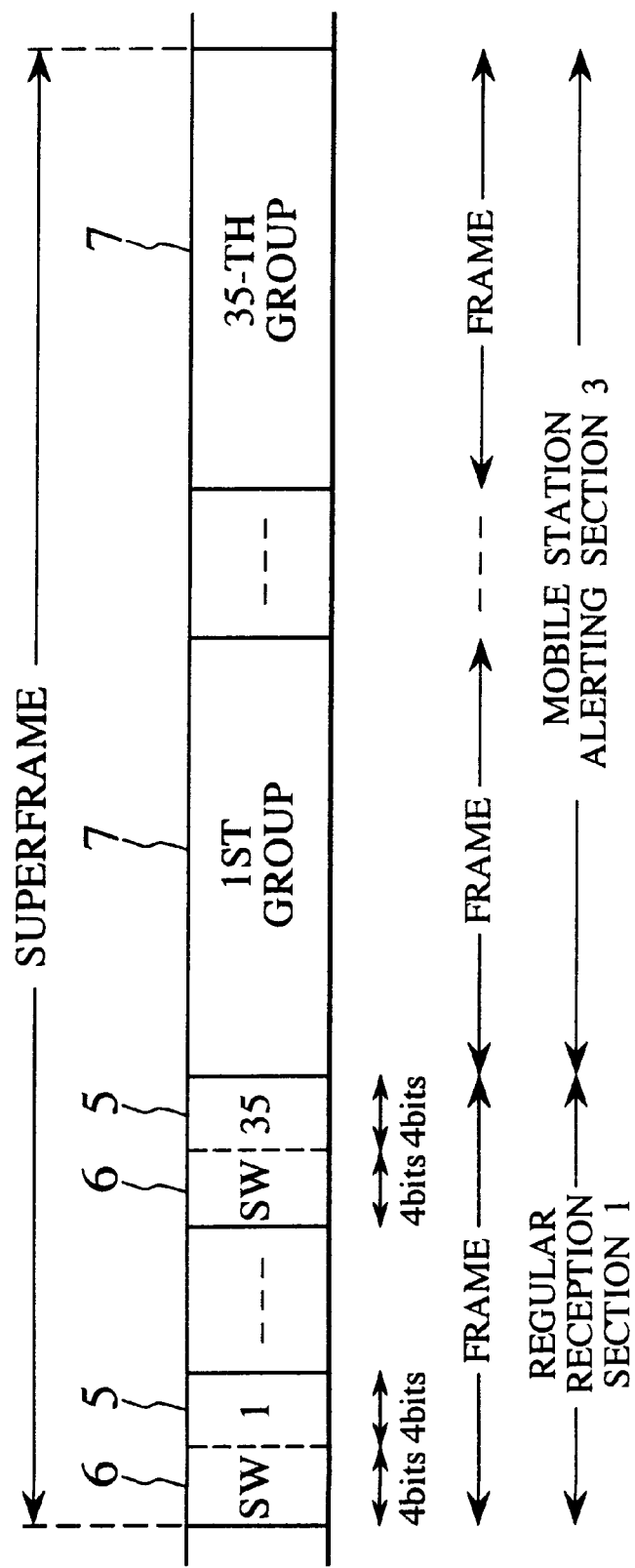
FIG. 14 is a diagram showing one exemplary configuration of a superframe according to the present invention, for explaining the intermittent rate improvement effect of the present invention.

Now, the effect concerning the improvement of the intermittent rate in the above described embodiments will be illustrated for an exemplary configuration shown in FIG. 14, in which the synchronization word (SW) 6 is inserted immediately in front of each paging indication region 5 of the regular reception section 1.

In calculating the intermittent rate for a case of using the superframe of FIG. 14, it is assumed that the signal format of the PDC is utilized. The signal format of the PDC is specified as follows.

1 superframe=36 frames 1 frame=3 time-slots 1 time-slot=280 bits

In addition, one frame of the one PDC superframe is set as the regular reception section 1, while the other thirty-five frames are set as the mobile station alerting section 3. The mobile station alerting section 3 has one frame per one group, so that it is divided into thirty-five groups. Also, the regular reception section 1 uses the synchronization word (SW) 6=4 bits and each paging indication region 5=4 bits.

In this case, the minimum intermittent rate for a case of having no paging will be given as follows.

$$\text{Minimum Intermittent Rate} = (4\text{ bits} + 4\text{ bits})/(280\text{ bits} \times 3\text{ time-slots} \times 36\text{ frames})$$

$$= 2.64 \times 10^{-4}$$

Also, the intermittent rate in a case of having one paging for one group in every ten superframes (7.2 seconds) will be given as follows.

$$\text{Intermittent Rate} = \{(4\text{ bits} + 4\text{ bits}) \times 10\text{ superframes} + 280\text{ bits}\}/$$

$$\{280\text{ bits} \times 3\text{ time-slots} \times 36\text{ frames} \times$$

$$10\text{ superframes}\}$$

$$= 1.19 \times 10^{-3}$$

Consequently, compared with the intermittent rate of 0.083 achieved in the conventional PDC as described in the description of the background art section, it can be seen that the intermittent rate is drastically improved according to the present invention. For this reason, the present invention is capable of considerably reducing the consumption of the battery power of the mobile station.

Figure 15:
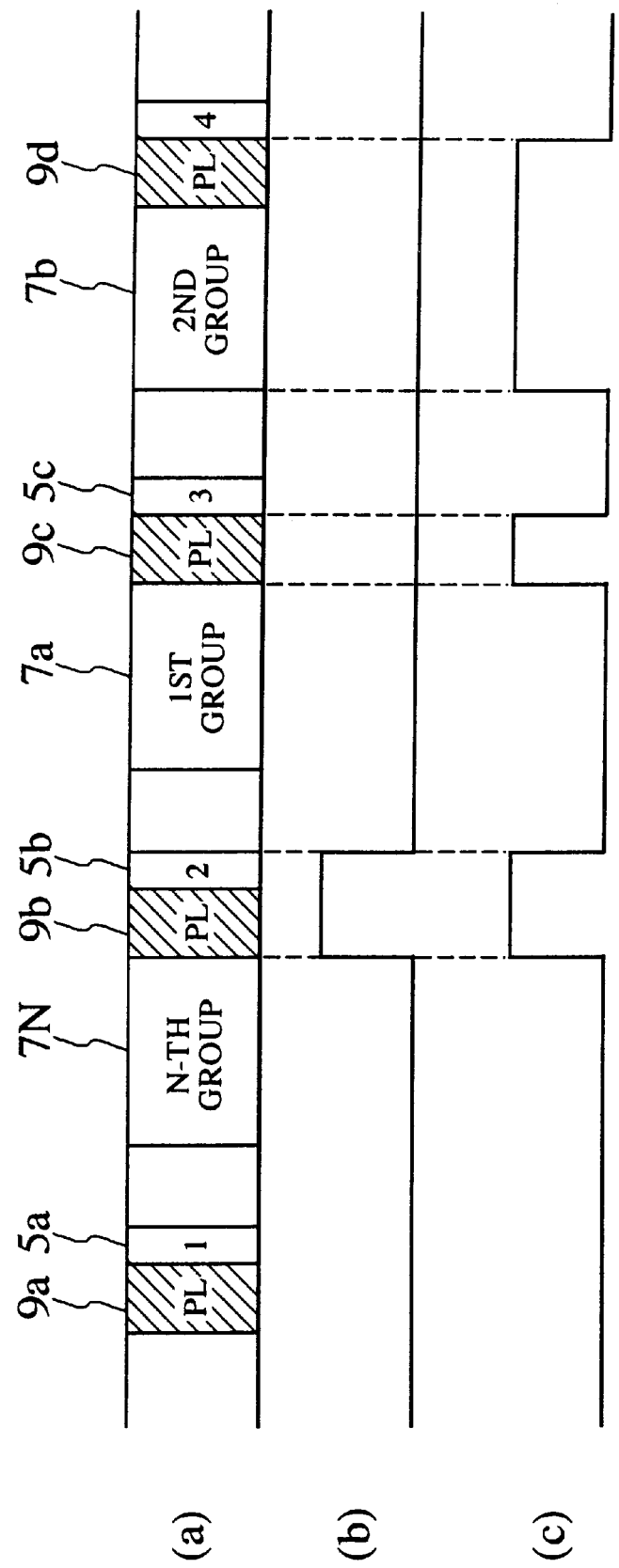
FIG. 15 is a diagram showing a configuration of a superframe and intermittent reception timings in the seventh embodiment of the present invention.

Referring now to FIG. 15, the seventh embodiment of a scheme for intermittent reception of paging signals in a mobile communication system according to the present invention will be described in detail.

This seventh embodiment is directed to one exemplary superframe configuration in a case where a scheme for intermittent reception of paging signals according to the present invention is applied to signals for coherent detection with interpolation in a coherent detection device as disclosed in Japanese Patent Application No. 6-140569 (1994).

In the mobile communication, the propagation function of a propagation path largely changes in conjunction with a move of the mobile station, and there is a need for the mobile station to estimate the propagation function of the propagation path at high speed in order to obtain the absolute phase of the transmission carrier waves. To this end, pilot signals (PL) given by symbols known to both the transmitting side and the receiving side in advance are periodically inserted into transmission signal, and the mobile station at the receiving side estimates the propagation function of the propagation path by using these pilot signals (PL). In Japanese Patent Application NO. 6-140569 (1994) mentioned above, the estimation of the propagation function is made by regarding the pilot signals (PL) as known symbols.

A part (a) of FIG. 15 shows a configuration of a superframe according to the seventh embodiment, in which the above described pilot signals (PL) 9a, 9b, 9c, 9d, and so on are periodically inserted into the superframe formed by the regular reception section and the mobile station alerting section according to the present invention, and the propagation function of the propagation path is estimated at high speed by using these pilot signals (PL) so as to be able to follow the high speed variation of the propagation function of the propagation path.

In this superframe of FIG. 15, the paging indication region 5a of the regular reception section for the first group and the identification information setting region 7N of the mobile station alerting section for the N-th group are provided immediately behind the first pilot signal (PL) 9a, the paging indication region 5b of the regular reception section for the second group and the identification information setting region 7a of the mobile station alerting section for the first group are provided immediately behind the second pilot signal (PL) 9b, the paging indication region 5c of the regular reception section for the third group and the identification information setting region 7b of the mobile station alerting section for the second group are provided immediately behind the third pilot signal (PL) 9c, and so on.

Note that, in FIG. 15, the paging indication region 5 of the regular reception section for each group and the identification information setting region 7 of the mobile station alerting section for each group are not provided consecutively, because the decoding of the paging indication region 5 cannot be carried out immediately in this case.

In the superframe of FIG. 15, in order to receive the paging indication region 5b of the regular reception unit for the second group, it suffices to carry out the control for turning the receiver circuit 35 of the mobile station ON at timings of the pilot signal (PL) 9b and this paging indication region 5b, as indicated in a part (b) of FIG. 15. Here, the paging indication region 5b is short and appears immediately behind the pilot signal (PL) 9b, so that the estimation result obtained from the pilot signal (PL) 9b is used for the reception of the paging indication region 5b.

Then, in a case where there is a paging with respect to this second group, it suffices to carry out the control for turning the receiver circuit 35 of the mobile station ON at timings of the pilot signal (PL) 9b, the paging indication region Sb, the pilot signal (PL) 9c, the identification information setting region 7b, and the pilot signal (PL) 9d which are related to this second group, as indicated in a part (c) of FIG. 15. As for the reception of the identification information setting region 7b, the estimation results obtained from both the pilot signal (PL) 9c and the pilot signal (PL) 9d are used because the identification information setting region 7b is long.

Figure 16:
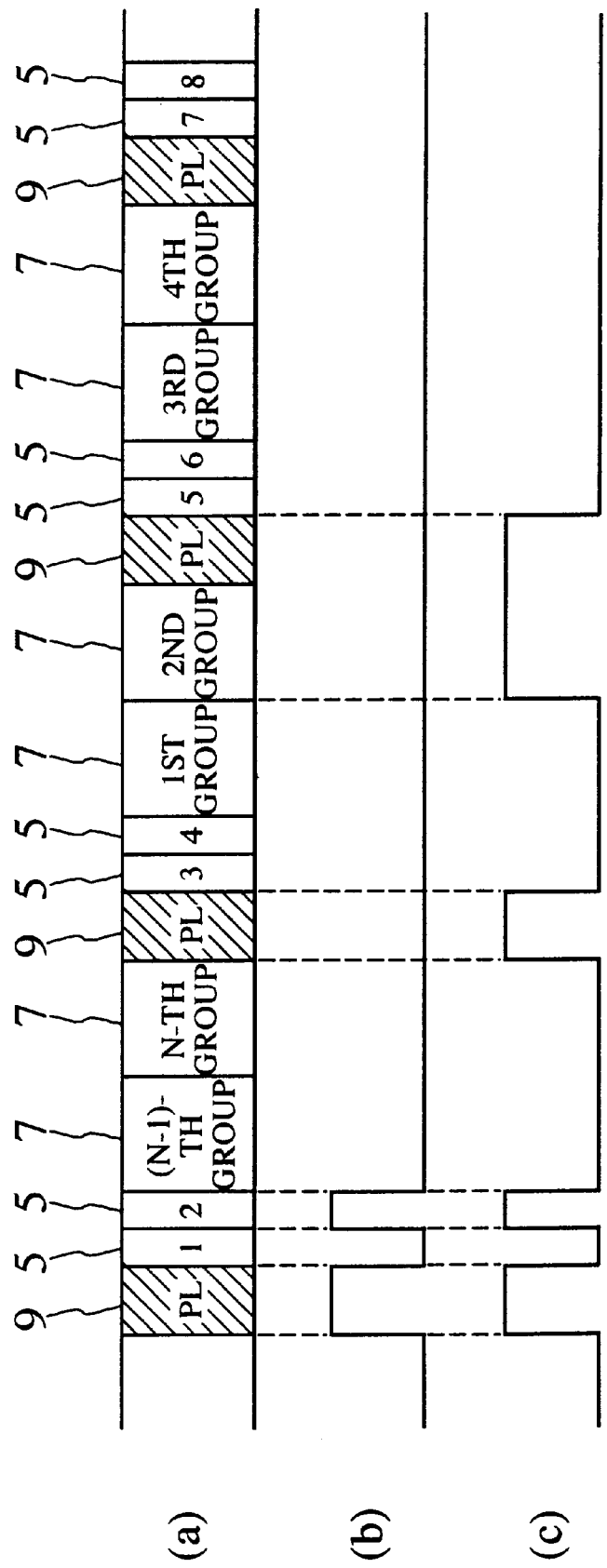
FIG. 16 is a diagram showing a configuration of a superframe and intermittent reception timings in the eighth embodiment of the present invention.

Referring now to FIG. 16, the eighth embodiment of a scheme for intermittent reception of paging signals in a mobile communication system according to the present invention will be described in detail.

This eighth embodiment is also directed to another exemplary superframe configuration in a case where a scheme for intermittent reception of paging signals according to the present invention is applied to signals for coherent detection with interpolation in a coherent detection device as disclosed in Japanese Patent Application No. 6-140569 (1994).

A part (a) of FIG. 16 shows a configuration of a superframe according to the seventh embodiment, which differs from the configuration of FIG. 15 in that the paging indication regions 5 of the regular reception section and the identification information setting regions 7 of the mobile station alerting section for two consecutive groups (first and second groups, third and fourth groups, fifth and sixth groups, and so on) are provided between each two pilot signals (PL) 9. The rest of this configuration of FIG. 16 is identical to that of FIG. 15.

A part (b) of FIG. 16 shows timings for turning the receiver circuit 35 of the mobile station ON in a case where there is no paging with respect to two consecutive groups, while a part (c) of FIG. 16 shows timings for turning the receiver circuit 35 of the mobile station ON in a case where there is a paging with respect to two consecutive groups.

As described, in a scheme for intermittent reception of paging signals according to the present invention, it is possible to drastically improve the intermittent rate and considerably reduce the consumption of the battery power of the mobile station, as illustrated in relation to FIG. 14. These effects can be similarly obtained for any of the FDMA, TDMA and CDMA schemes that can be used in the mobile communication system. However, in a case of CDMA in particular, it is possible to improve the intermittent rate further by increasing a number of groups for grouping the mobile stations, because the CDMA is unrelated to concepts of frequency and time unlike FDMA and TDMA so that an increase of a number of groups does not affect the radio channel capacity. Namely, in a case of TDMA, if a number of groups is increased, as many time-slots as an increased number of groups would have to be used and eventually all the radio channels would be used up, so that a number of groups cannot be increased very much. In contrast, in a case of CDMA, the radio channel capacity is determined by the amount of interference, and an amount of interference does not increase when the transmission of the identification information setting regions is stopped for a group for which there is no paging, so that an increase of a number of groups does not cause any problem. When a number of groups is increased, a frequency for receiving the mobile station alerting section of the superframe becomes less, so that the present invention is even more effective in a case of CDMA.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method of intermittent reception of paging signals in a mobile communication system formed by mobile stations which are grouped into a plurality of groups and base stations, comprising the steps of:

transmitting a frame from each base station repeatedly, said frame including:

at least one regular reception section having a plurality of paging indication regions corresponding to said plurality of groups, in which a paging presence information configured to indicate a presence of a paging with respect to a mobile station of a group is set in a paging indication region corresponding to said group when a paging with respect to a mobile station of said group occurs;

a mobile station alerting section having a plurality of identification information setting regions corresponding to said plurality of paging indication regions, in which an identification information of a mobile station called by a paging indicated by a paging indication region is set in an identification information setting region corresponding to said paging indication region; and a plurality of pilot signals to be used for estimating a propagation function of a propagation path which are periodically inserted into said frame, wherein the paging indication region for one group and the identification information setting region for another group are provided between each two consecutive pilot signals; and receiving said frame at each mobile station by operating a receiver circuit of said each mobile station intermittently.

2. The method of claim 1, wherein said each mobile station receives an information in at least one paging indication region corresponding to one group to which said each mobile station belongs, by selectively operating the receiver circuit during a period of time corresponding to said at least one paging indication region in the regular reception section of said frame.

3. The method of claim 2, wherein when the information in said at least one paging indication region is the paging presence information, said each mobile station makes an access to an information in one identification information setting region corresponding to said at least one paging indication region, by selectively operating the receiver circuit during a period of time corresponding to said one identification information setting region in the mobile station alerting section of said frame.

4. The method of claim 3, wherein said frame includes more than one paging indication regions corresponding to each group, and said each mobile station makes said access when the paging presence information is set in no less than a prescribed number of said more than one paging indication regions corresponding to said one group.

5. The method of claim 4, wherein said prescribed number is a half of a total number of said more than one paging indication regions corresponding to each group.

6. The method of claim 3, wherein said frame includes more than one regular reception sections, each having a plurality of paging indication regions corresponding to said plurality of groups, and said each mobile station makes said access when the paging presence information is set in no less than a prescribed number of paging indication regions corresponding to said one group in said more than one regular reception sections.

7. The method of claim 6, wherein said prescribed number is a half of a total number of said more than one regular reception sections provided in correspondence to each group.

8. The method of claim 3, wherein said frame includes than one regular reception sections, each having a plurality of paging indication regions corresponding to each group, and said each mobile station sequentially receives said plurality of paging indication regions corresponding to said one group in said more than one regular reception sections, and makes said access when the paging presence information is set in all of said plurality of paging indication regions corresponding to said one group in any of said more than one regular reception sections, or stops operating the receiver circuit until a next frame when the paging presence information is not set in any of said plurality of paging indication regions corresponding to said one group in any of said more than one regular reception sections.

9. The method of claim 8, wherein when said plurality of paging indication regions corresponding to said one group do not have identical information in all of said more than one regular reception sections, said each mobile station makes said access if the paging presence information is set in no less than a prescribed number of paging indication regions corresponding to said one group among said more than one regular reception sections.

10. The method of claim 1, wherein said frame also includes a synchronization word to be used for maintaining a synchronization which is provided immediately in front of said at least one regular reception section.

11. The method of claim 1, wherein said frame also includes a synchronization word to be used for maintaining a synchronization which is provided immediately in front of each paging indication region of said at least one regular reception section.

12. The method of claim 11, wherein the synchronization word is also provided immediately in front of each identification information setting region of the mobile station alerting section.

13. A method of intermittent reception of paging signals in a mobile communication system formed by mobile stations which are grouped into a plurality of groups and base stations, comprising the steps of;

transmitting a frame from each base station repeatedly, said frame including:

at least one regular reception section having a plurality of paging indication regions corresponding to said plurality of groups, in which a paging presence information configured to indicate a presence of a paging with respect to a mobile station of a group is set in a paging indication region corresponding to said group when a paging with respect to the mobile station of said group occurs;

a mobile station alerting section having a plurality of identification information setting regions corresponding to said plurality of paging indication regions, in which an identification information of a mobile station called by a paging indicated by a paging indication region is set in an identification information setting region corresponding to said paging indication region; and a plurality of pilot signals to be used for estimating a propagation function of a propagation path which are periodically inserted into said frame, wherein the paging indication regions for two group and the identification information setting regions for another two groups are provided between each two consecutive pilot signals; and receiving said frame at each mobile station by operating a receiver circuit of said each mobile station intermittently.

14. The method of claim 13, wherein said each mobile station receives an information in at least one paging indication region corresponding to one group to which said each mobile station belongs, by selectively operating the receiver circuit during a period of time corresponding to said at least one paging indication region in the regular reception section of said frame.

15. The method of claim 14, wherein when the information in said at least one paging indication region is the paging presence information, said each mobile station makes an access to an information in one identification information setting region corresponding to said at least one paging indication region, by selectively operating the receiver circuit during a period of time corresponding to said one identification information setting region in the mobile station alerting section of sail frame.

16. The method of claim 15, wherein said frame includes more than one paging indication region corresponding to each group, and said each mobile station makes said access when the paging presence information is set in no less than a prescribed number of said more than one paging indication region corresponding to said one group.

17. The method of claim 16, wherein said prescribed number is a half of a total number of said more than one paging indication regions corresponding to each group.

18. The method of claim 15, wherein said frame includes more than one regular reception section, each having a plurality of paging indication regions corresponding to said plurality of groups, and said each mobile station makes said access when the paging presence information is set in no less than a prescribed number of paging indication regions corresponding to said one group in said more than one regular reception section.

19. The method of claim 18, wherein said prescribed number is a half of a total number of said more than one regular reception section corresponding to each group.

20. The method of claim 15, wherein said frame includes more than one regular reception section, each having a plurality of paging indication regions corresponding to each group, and said each mobile station sequentially receives said plurality of paging indication regions corresponding to said one group in said more than one regular reception section, and makes said access when the paging presence information is set in all of said plurality of paging indication regions corresponding to said one group in any of said more than one regular reception section, or stops operating the receiver circuit until a next frame when the paging presence information is not set in any of said plurality of paging indication regions corresponding to said one group in any of said more than one regular reception section.

21. The method of claim 20, wherein when said plurality of paging indication regions corresponding to said one group do not have identical information in all of said more than one regular reception section, said each mobile station makes said access if the paging presence information is set in no less than a prescribed number of paging indication regions corresponding to said one group among said more than one regular reception section.

22. The method of claim 13, wherein said frame also includes a synchronization word to be used for maintaining a synchronization which is provided immediately in front of said at least one regular reception section.

23. The method of claim 13, wherein said frame also includes a synchronization word to be used for maintaining a synchronization which is provided immediately in front of each paging indication region of said at least one regular reception section.

24. The method of claim 23, wherein the synchronization word is also provided immediately in front of each identification information setting region of the mobile station alerting section.

25. A base station apparatus for use in a mobile communication system formed by mobile stations which are grouped into a plurality of groups and base stations, in which each mobile station receives paging signals transmitted from each base station by operating a receiver circuit of said each mobile station intermittently, the base station apparatus comprising:

a regular reception section forming circuit configured to form at least one regular reception section of a frame to be transmitted, said at least one regular reception section having a plurality of paging indication regions provided in corresponding to said plurality of groups, in which a paging presence information configured to indicate a presence of a paging with respect to a mobile station of a group is set in a paging indication region corresponding to said group when a paging with respect to a mobile station of said group occurs;

a mobile station alerting section forming circuit configured to form a mobile station alerting section of said frame, the mobile station alerting section having a plurality of identification information setting regions corresponding to said plurality of paging indication regions, in which an identification information of a mobile station called by a paging indicated by a paging indication region is set in an identification information setting region corresponding to said paging indication region; and a transmission circuit configured to form said frame by combining said at least one regular reception section and the mobile station alerting section and periodically inserting a plurality of pilot signals to be used for estimating a propagation function of a propagation path such that the paging indication region for one group and the identification information setting region for another group are provided between each two consecutive pilot signals, and transmitting said frame as the paging signals to the mobile stations repeatedly.

26. The base station apparatus of claim 25, further comprising:

a control circuit configured to calculate a group number of one group to which a called mobile station belongs, according to a called mobile station identification information extracted from paging signals received from an upper level station of the base station apparatus, and configured to control the regular reception section forming circuit to set the paging presence information in one paging indication region corresponding to said one group in forming said at least one regular reception section, while controlling the mobile station alerting section forming circuit to set the identification information of said called mobile station in the identification information setting region corresponding to said one paging indication region in forming the mobile station alerting section.

27. A mobile station apparatus for use in a mobile communication system formed by mobile stations which are grouped into a plurality of groups and base stations, in which each base station is repeatedly transmitting a frame which contains: (1) at least one regular reception section having a plurality of paging indication regions corresponding to said plurality of groups, in which a paging presence information configured to indicate a presence of a paging with respect to a mobile station of a group is set in a paging indication region corresponding to said group when a paging with respect to a mobile station of said group occurs; (2) a mobile station alerting section having a plurality of identification information setting regions corresponding to said plurality of paging indication regions, in which an identification information of a mobile station called by a paging indicated by a paging indication region is set in an identification information setting region corresponding to said paging indication region; and (3) a plurality of pilot signals to be used for estimating a propagation function of a propagation path which are periodically inserted into said frame, wherein the paging indication region for one group and the identification information setting region for another group are provided between each two consecutive pilot signals;

the mobile station apparatus comprising:

a battery for providing a power;

a receiver circuit configured to receive said frame transmitted from each base station and obtaining an information in the paging indication region and an information in the identification information setting region, by being supplied with the power provided by the battery; and a reception ON/OFF judging circuit configured to intermittently operate the receiver circuit to receive an information in at least one paging indication region corresponding to one group to which the mobile station apparatus belongs, by selectively supplying the power from the battery to the receiver circuit during a period of time corresponding to said at least one paging indication region and a pilot signal inserted immediately in front of said at least one paging indication region in the regular reception section of said frame, and when the information in said at least one paging indication region is the paging presence information, intermittently operating the receiver circuit to make an access to an information in one identification information setting region corresponding to said at least one paging indication region, by selectively supplying the power from the battery to the receiver circuit during a period of time corresponding to said one identification information setting region and pilot signals inserted immediately in front and behind of said one identification information setting region in the mobile station alerting section of said frame; and a control circuit configured to receive the information in the identification information setting region obtained by the receiver circuit, and to carry out a paging connection processing when the information in the identification information setting region contains an identification information of the mobile station apparatus.

28. The mobile station apparatus of claim 27, wherein the control circuit also calculates a group number of a group to which the mobile station apparatus belongs, from the identification information of the mobile station apparatus, and supplies the calculated group number to the reception ON/OFF judging circuit, the receiver circuit also generates a frame timing from said frame, and supplies the generated frame timing to the reception ON/OFF judging circuit; and the reception ON/OFF judging circuit determines timings for supplying the power from the battery to the receiver circuit according to the group number and the frame timing.

29. A base station apparatus for use in a mobile communication system formed by mobile stations which are grouped into a plurality of groups and base stations, in which each mobile station receives paging signals transmitted from each base station by operating a receiver circuit of said each mobile station intermittently, the base station apparatus comprising:

a regular reception section forming circuit configured to form at least one regular reception section of a frame to be transmitted, said at least one regular reception section having a plurality of paging indication regions corresponding to said plurality of groups, in which a paging presence information configured to indicate a presence of a paging with respect to a mobile station of a group is set in a paging indication region corresponding to said group when a paging with respect to a mobile station of said group occurs;

a mobile station alerting section forming circuit configured to form a mobile station alerting section of said frame, the mobile station alerting section having a plurality of identification information setting regions corresponding to said plurality of paging indication regions, in which an identification information of a mobile station called by a paging indicated by a paging indication region is set in an identification information setting region corresponding to said paging indication region; and a transmission circuit configured to form said frame by combining said at least one regular reception section and the mobile station alerting section and periodically inserting a plurality of pilot signals to be used for estimating a propagation function of a propagation path such that the paging indication regions for two groups and the identification information setting regions for another two groups are provided between each two consecutive pilot signals, and transmitting said frame as the paging signals to the mobile stations repeatedly.

30. The base station apparatus of claim 29, further comprising:

a control circuit configured to calculate a group number of one group to which a called mobile station belongs, according to a called mobile station identification information extracted from paging signals received from an upper level station of the base station apparatus, and configured to control the regular reception section forming circuit to set the paging presence information in one paging indication region corresponding to said one group in forming said at least one regular reception section, while controlling the mobile station alerting section forming circuit to set the identification information of said called mobile station in the identification information setting region corresponding to said one paging indication region in forming the mobile station alerting section.

31. A mobile station apparatus for use in a mobile communication system formed by mobile stations which are grouped into a plurality of groups and base stations, in which each base station is repeatedly transmitting a frame which contains: (1) at least one regular reception section having a plurality of paging indication regions corresponding to said plurality of groups, in which a paging presence information configured to indicate a presence of a paging with respect to a mobile station of a group is set in a paging indication region corresponding to said group when a paging with respect to a mobile station of said group occurs; (2) a mobile station alerting section having a plurality of identification information setting regions corresponding to said plurality of paging indication regions, in which an identification information of a mobile station called by a paging indicated by a paging indication region is set in an identification information setting region corresponding to said paging indication region; and (3) a plurality of pilot signal to be used for estimating a propagation function of a propagation path which are periodically inserted into said frame, wherein the paging indication regions for two groups and the identification information setting regions for another two groups are provided between each two consecutive pilot signals;

the mobile station apparatus comprising:

a battery for providing a power;

a receiver circuit configured to receive said frame transmitted from each base station and to obtain an information in the paging indication region and an information in the identification information setting region, by being supplied with the power provided by the battery; and a reception ON/OFF judging circuit configured to intermittently operate the receiver circuit to receive an information in at least one paging indication region corresponding to one group to which the mobile station apparatus belongs, by selectively supplying the power from the battery to the receiver circuit during a period of time corresponding to said at least one paging indication region and a pilot signal inserted immediately in front of said at least one paging indication region in the regular reception section of said frame, and when the information in said at least one paging indication region is the paging presence information, intermittently operating the receiver circuit to make an access to an information in one identification information setting region corresponding to said at least one paging indication region, by selectively supplying the power from the battery to the receiver circuit during a period of time corresponding to said one identification information setting region and pilot signals inserted immediately in front and behind of said one identification information setting region in the mobile station alerting section of said frame; and a control circuit configured to receive the information in the identification information setting region obtained by the receiver circuit, and to carry out a paging connection processing when the information in the identification information setting region contains an identification information of the mobile station apparatus.

32. The mobile station apparatus of claim 31, wherein the control circuit also calculates a group number of a group to which the mobile station apparatus belongs from the identification information of the mobile station apparatus, and supplies the calculated group number to the reception ON/OFF judging circuit, the receiver circuit also generates a frame timing from said frame, and supplies the generated frame timing to the reception ON/OFF judging circuit; and the reception ON/OFF judging circuit determines timings for supplying the power from the battery to the receiver circuit according to the group number and the frame timing.

\* \* \* \* \*